United States Patent
Belcher

(10) Patent No.: US 7,175,208 B2
(45) Date of Patent: Feb. 13, 2007

(54) HIGH TEMPERATURE END FITTING AND METHOD OF USE

(75) Inventor: John R. Belcher, Panama City, FL (US)

(73) Assignee: Wellstream International Limited, Newcastle Upon Tyne (GB)

( * ) Notice: Subject to any disclaimer, the term of this patent is extended or adjusted under 35 U.S.C. 154(b) by 0 days.

(21) Appl. No.: 10/377,480

(22) Filed: Feb. 27, 2003

(65) Prior Publication Data

US 2004/0036280 A1     Feb. 26, 2004

Related U.S. Application Data

(63) Continuation-in-part of application No. 09/689,075, filed on Oct. 12, 2000, now Pat. No. 6,592,153.

(51) Int. Cl.
F16L 33/00 (2006.01)

(52) U.S. Cl. .................. 285/249; 285/342; 285/222.2; 29/237

(58) Field of Classification Search ............ 285/382.7, 285/342, 343, 249, 222.1–222.4; 29/237; 138/109, 104
See application file for complete search history.

(56) References Cited

U.S. PATENT DOCUMENTS

| | | | | |
|---|---|---|---|---|
| 1,186,813 A | * | 6/1916 | McFerran | 285/341 |
| 1,983,840 A | * | 12/1934 | Dohner | 285/341 |
| 2,076,632 A | * | 4/1937 | Goodall | 285/55 |
| 2,234,350 A | * | 3/1941 | Muller | 285/222.3 |
| 2,258,528 A | * | 10/1941 | Wurzburger | 285/341 |
| 2,394,632 A | * | 2/1946 | Parker | 285/222.1 |
| 2,437,632 A | * | 3/1948 | Wolfram | 285/342 |
| 2,624,413 A | * | 1/1953 | Mueller et al. | 285/123.6 |
| 3,112,937 A | * | 12/1963 | Williams | 285/114 |
| 3,127,198 A | * | 3/1964 | Orund | 285/123.6 |
| 3,148,898 A | * | 9/1964 | Somers | 285/222.1 |
| 3,498,646 A | * | 3/1970 | Depuy | 285/339 |
| 3,695,640 A | * | 10/1972 | Clague | 285/116 |
| 3,857,591 A | * | 12/1974 | Voss | 285/341 |

(Continued)

FOREIGN PATENT DOCUMENTS

WO     WO 97/25564     *     7/1997

(Continued)

OTHER PUBLICATIONS

Patent Cooperation Treaty, International Search Report (European Patent Office), "Notification of Transmittal of The International Search Report and the Written Opinion of the International Searching Authority, or the Declaration," Jun. 15, 2004, 15 pages.

*Primary Examiner*—David Bochna
(74) *Attorney, Agent, or Firm*—Klarquist Sparkman, LLP

(57) ABSTRACT

Embodiments of a system and method for sealing an end of a flowline to an end fitting are disclosed. Such methods include providing an end fitting housing having a bore, wherein a portion of the bore has a tapered inner surface, inserting an open end of a flexible pipe into the bore, the flexible pipe having an external layer, to create a tapered annular space between the tapered inner surface and the external layer, and positioning a ring into the tapered annular space such that the ring radially contracts upon the external layer causing the external layer to deform to create a seal.

10 Claims, 5 Drawing Sheets

U.S. PATENT DOCUMENTS

| | | | |
|---|---|---|---|
| 4,138,147 A | * | 2/1979 | Manchester et al. ...... 285/145.1 |
| 4,309,050 A | * | 1/1982 | Legris .......................... 285/341 |
| 4,529,231 A | * | 7/1985 | Greenawalt ................. 285/342 |
| 4,679,826 A | * | 7/1987 | Olsen ....................... 285/222.1 |
| 4,773,452 A | * | 9/1988 | Dotti et al. .................. 138/109 |
| 4,867,489 A | * | 9/1989 | Patel ........................... 285/342 |
| 4,906,028 A | * | 3/1990 | Yokomatsu et al. ........ 285/101 |
| 4,950,001 A | * | 8/1990 | Briggs ...................... 285/222.1 |
| 5,355,961 A | * | 10/1994 | Gariepy et al. ............. 166/387 |
| 5,639,128 A | * | 6/1997 | Belcher .................... 285/222.1 |
| 5,860,682 A | * | 1/1999 | Belcher .................... 285/222.1 |
| 6,019,137 A | * | 2/2000 | Secher et al. .......... 137/601.01 |
| 6,073,976 A | * | 6/2000 | Schmidt et al. ............. 285/341 |
| 6,592,153 B1 | * | 7/2003 | Belcher .................... 285/222.2 |
| 2004/0066035 A1 | * | 4/2004 | Buon et al. ............... 285/222.2 |

FOREIGN PATENT DOCUMENTS

| | | |
|---|---|---|
| WO | WO 02/31396 A1 | 4/2002 |
| WO | WO 02/39003 * | 5/2002 |
| WO | WO 02/39003 A1 | 5/2002 |

* cited by examiner

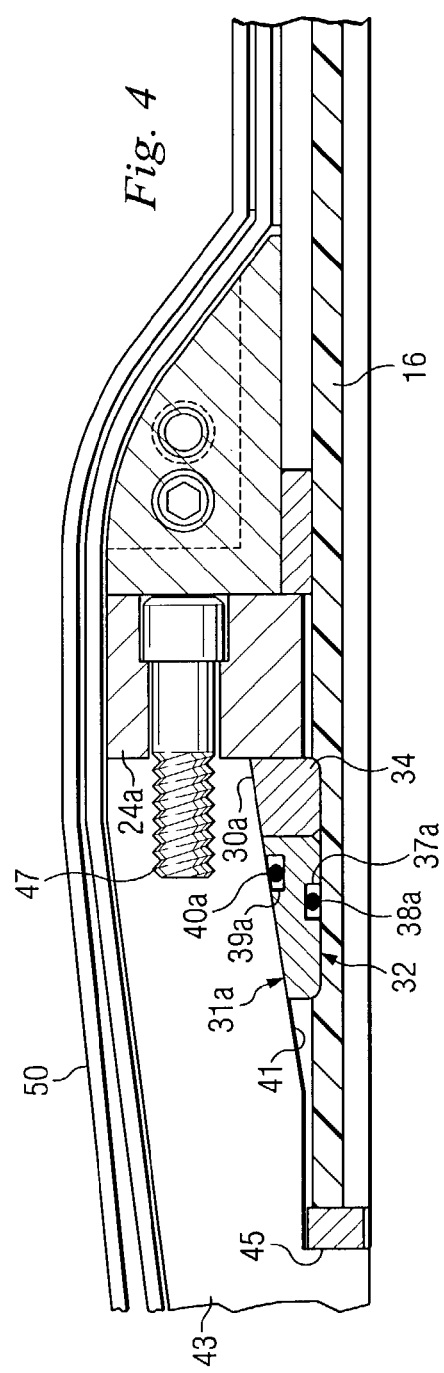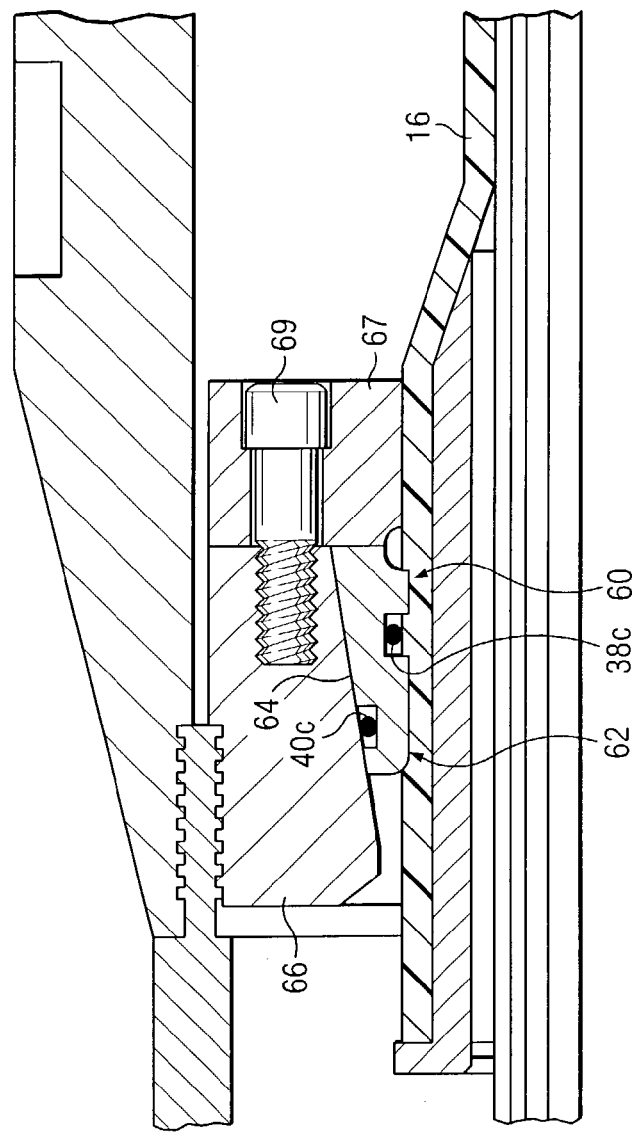

HIGH TEMPERATURE END FITTING AND METHOD OF USE

CROSS REFERENCE TO RELATED APPLICATION(S)

This is a continuation-in-part of Ser. No. 09/689,075, entitled High Temperature End Fitting and Method of Use, filed on Oct. 12, 2000 now U.S. Pat. NO. 6,592,153 which is hereby incorporated by reference.

TECHNICAL FIELD

The invention relates in general to end fittings that retain and seal at least one open end of flexible pipe, and in particular to high temperature end fittings.

BACKGROUND INFORMATION

A flexible flowline is comprised typically of several distinct concentric layers that afford strength and flexibility to the flowline. The innermost layer, known as the carcass, prevents collapse of the flowline due to external hydrostatic pressure. The immediately adjacent layer, known as the barrier, is constructed from a synthetic polymer material and serves to prevent content leakage. There may also be succession of other layers of varying materials forming the overall composite of the flowline.

A flexible flowline may be utilized, for example, as a dynamic riser to couple a rigid flowline or another flexible flowline on the seabed to a floating vessel or buoy to convey production fluids such as oil, gas or oil/gas mixtures under pressure from an oil/gas well or platform to the vessel or buoy. An end fitting can be utilized to couple the flexible flowline at each end to an adjacent flowline or wellhead and the vessel or buoy.

One or more leak-tight seals contained in the end fitting has been achieved in the manner of the prior art utilizing a seal ring which, for example, encircles and engages the external surface of the barrier layer. This ring holds the barrier and carcass layers in position within the end fitting by a frictional force generated from the pressure of the seal ring on the barrier layer.

While functioning well, problems with the foregoing seals have arisen inside the end fitting where the flowline and end fitting are subjected to extreme fluctuations in temperature. Such extremes are known to occur in the flowline and end fitting when they are, for example, subjected to repeated changes in temperature as where, the flowline may be exposed to a temperature in excess 100° C. when production fluid is conveyed through the flowline and subsequently may be exposed to temperatures on the order of 0° C. from sea water when flow of the production fluid is interrupted or discontinued.

Repeated thermal cycling in the foregoing manner can result in a loss of seal integrity due to stress relaxation and creep of the barrier layer, followed by loss of compression at the seal. That is, with the seal area being highly stressed in compression, the flowline material at the beginning of service is often in its most highly plasticized state. This, plasticized state, however, deteriorates with time until ultimately a loss in barrier thickness occurs and a state of equilibrium is reached. Once compression at the interface of the seal ring and barrier declines to a low but non-zero level, loss of fluid content in the flowline can occur. Phenomena such as thermal expansion and creep can work to reduce or eliminate compression between the seal ring and the polymer layer.

Despite recognition of the forgoing, it has not been previously known how to satisfactorily eliminate the loss of tension and sealing of the flowline that can occur as described above.

SUMMARY OF THE INVENTION

This invention relates to an improved seal construction for an end fitting in which an open end of flexible flowline is to be received. More specifically, the invention relates to such an end fitting in which a novel seal construction is provided capable of functioning to compensate, offset or be unaffected by the adverse effects of temperature swings to which the fitting is exposed in service.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

FIG. 4 is an enlarged sectional elevation of a seal hereof as utilized in the end fitting of FIG. 3;

FIG. 5 is a further enlarged sectional elevation of a seal construction at a different location in an end fitting in accordance with the invention;

DETAILED DESCRIPTION

The following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
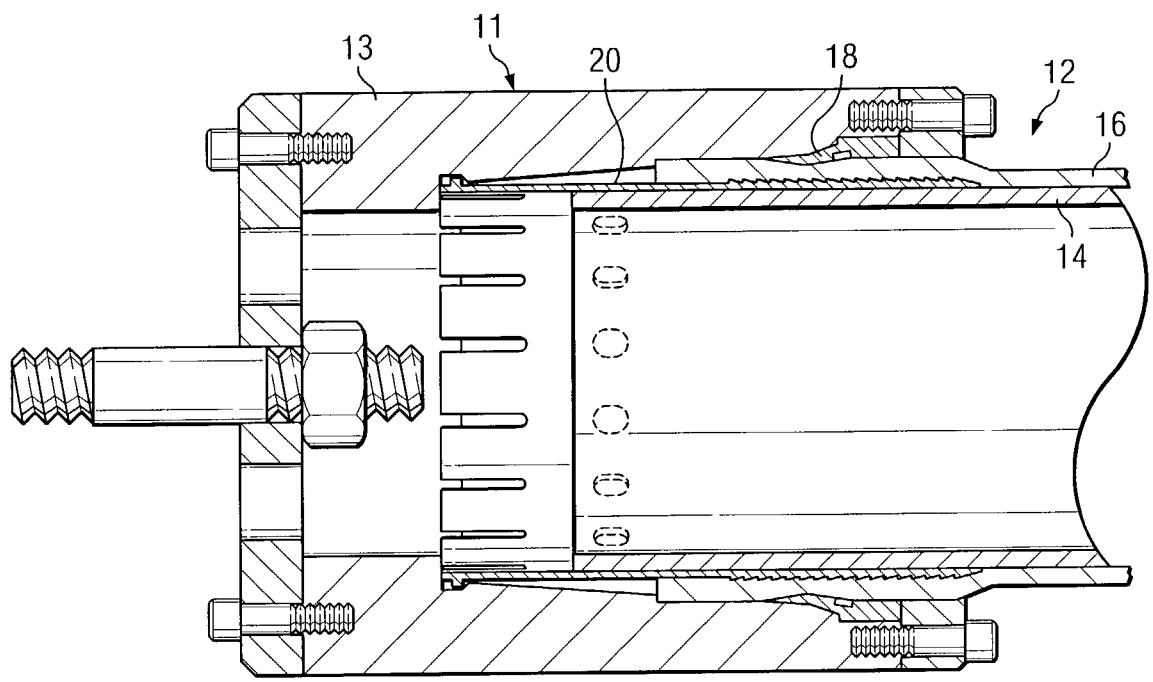
FIG. 1 is a sectional view of a prior art end fitting containing a received pipe end to be secured.

Referring now to FIG. 1 of the drawings, there is illustrated a prior art end fitting designated 11 as disclosed, for example, in U.S. Pat. No. 5,639,128 incorporated herein by reference and available from commercial sources such as Wellstream, Inc. of Panama City, Fla. Briefly, the end fitting 11 comprises an annular body 13 adapted to receive a flexible flowline 12 which comprises an interior or carcass layer 14 and an exterior or barrier layer 16. An inner seal ring 18 presses against the external surface of the barrier layer 16. A sleeve 20 is received intervening between the carcass layer 14 and the barrier layer 16. As shown, the seal ring 18 is compressed between the interior wall surface of the annular body 13 and the exterior surface of the barrier layer 16. The barrier layer 16 may be of a relatively soft material, such as polymer. The polymer may be of many different types, such as polyvinylidene fluoride (PVDF). PVDF has a relatively high thermal expansion coefficient and softens when heated to its maximum service temperature. The sleeve 20 is placed below the seal ring 18 in order to provide increased support for the compressive forces that result from deforming the seal ring 18 into the barrier layer 16. The carcass layer 14 is typically steel or stainless steel. Because the carcass layer 14 and the body 13 are typically made from steel or stainless steel, their thermal expansion coefficient is much less that the barrier layer 16. Thus, under heat, the barrier layer 16 undergoes stress relaxation and the compressive forces transferred by the barrier are reduced. When cooled, the barrier layer 16 has lost some of its ability to recover and tends to shrink away from the seal ring 18, which could cause the connection to fail. On the other hand, some embodiments may not include a sleeve 20. In this case, the barrier layer 16 is supported by the carcass layer 14.

Figure 2:
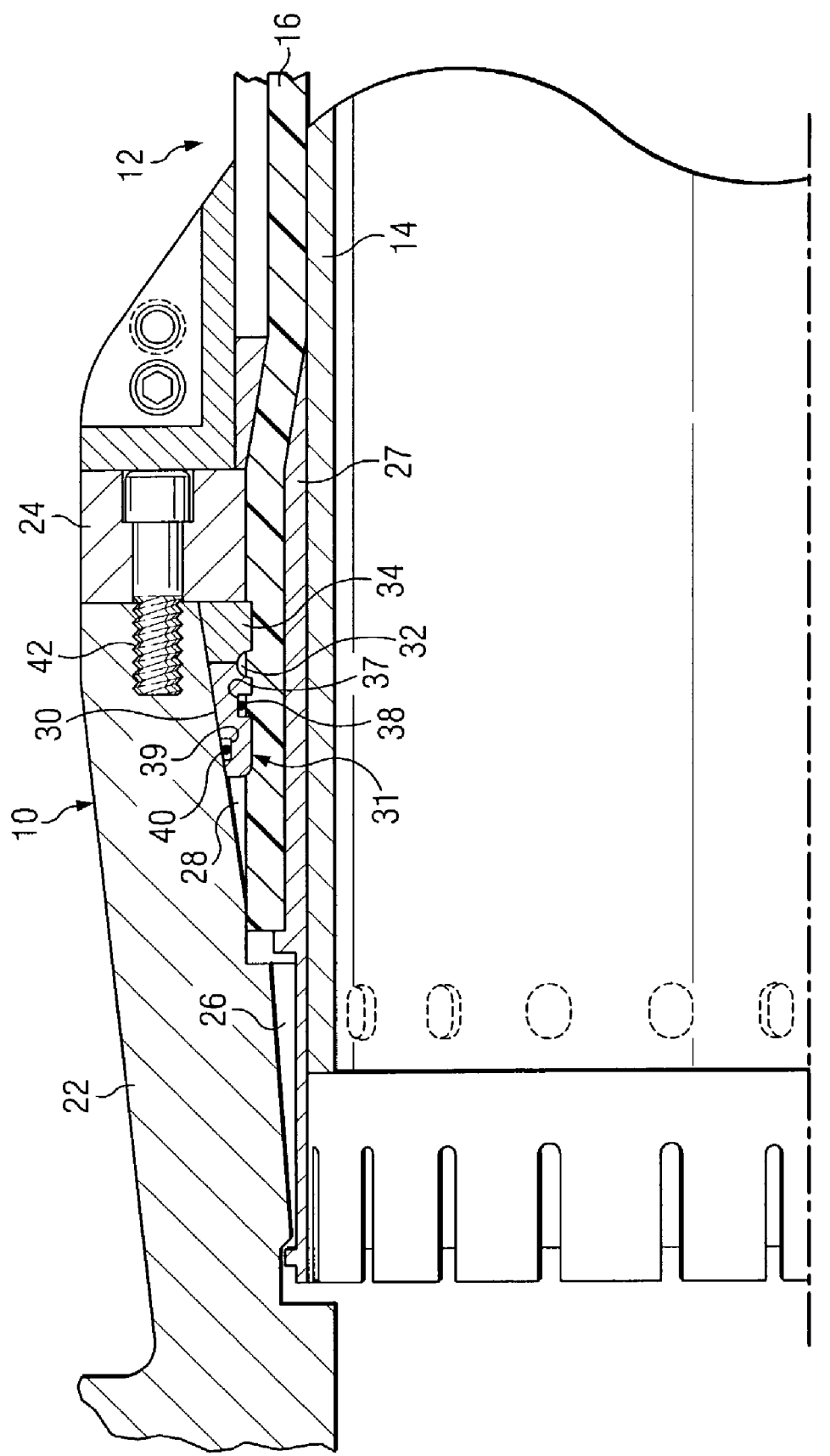
FIG. 2 is a sectional view of an exemplary end fitting containing the improved seal unit construction in accordance with the invention.

Referring to FIG. 2, there is an illustrated exemplary end fitting 10 incorporating one aspect of the present invention. Only the top half of the end fitting 10 is illustrated in FIG. 2 because the lower half is symmetrical with the top half. The end fitting 10 includes an annular body 22, an inner collar 24, a body ring 26 and a barrier sleeve 27. An interior surface of a counter-bore 28 in the body 22 and an exterior surface of a barrier layer 16 defines a wedge-like tapered recess 30. A tapered wedge-shaped seal unit 31 is positioned within the recess 30. In the illustrative embodiment, the seal unit 31 comprises a housing ring 32 and a housing drive-ring 34. The housing ring 32 may be made from a compressible metal, such as an annealed corrosion resistant metal, or a relatively hard polymer, such as polyphenylene sulfide or other deformable material compatible with fluids to be conveyed through the flowline. The housing ring 32 is generally wedge shaped so as to fit within the tapered recess 30. The housing ring 32 may have annular grooves defined on its interior surface, such as annular groove 37. A compressible seal 38, such as an elastomeric O-ring, may be positioned within the annular groove 37. Similarly, the housing ring 32 may have an annular groove 39 defined in its exterior surface. A compressible seal 40 may be positioned annular groove 39.

In operation, a plurality of bolts 42 radially positioned around the fitting 10 are tightened which causes the inner collar 24 to move closer to the annular body 22. As the inner collar 24 moves closer, the drive ring 34 is also moved closer to the annular body 22. The movement of the drive ring 34 causes an axial force on the seal unit 31 thereby driving the seal unit 31 further into the recess 30. The axial force on the seal unit 31 also causes the seal unit to deform in a radially inwardly direction towards the underling barrier layer 16. This deformation reduces the inside diameter of the housing ring 32 by forcing it onto a mating part of the end fitting which has a diameter smaller than that of the housing ring. This reduction in diameter of the housing ring 32 causes the surface of the barrier layer 16 to deform until all gaps between the barrier layer 16 and the seal unit 31 are eliminated. Flexible seals, such as the seals 38 and 40, may also be used to further reinforce the seal in the event of additional relaxation of the barrier layer 16. As a result of the foregoing, the seal, or seals provide a means to seal against an irregular surface which may, for example, be an extruded polymer tube such as the barrier of the received flowline. By forcing the housing ring 32 onto the polymer barrier surface 16, any surface irregularities are gradually reduced until the gaps between the housing ring and the barrier layer 16 are significantly reduced or eliminated. By reducing the gaps, the problem of potential extrusion of the flexible seals is also significantly reduced.

Figure 3:
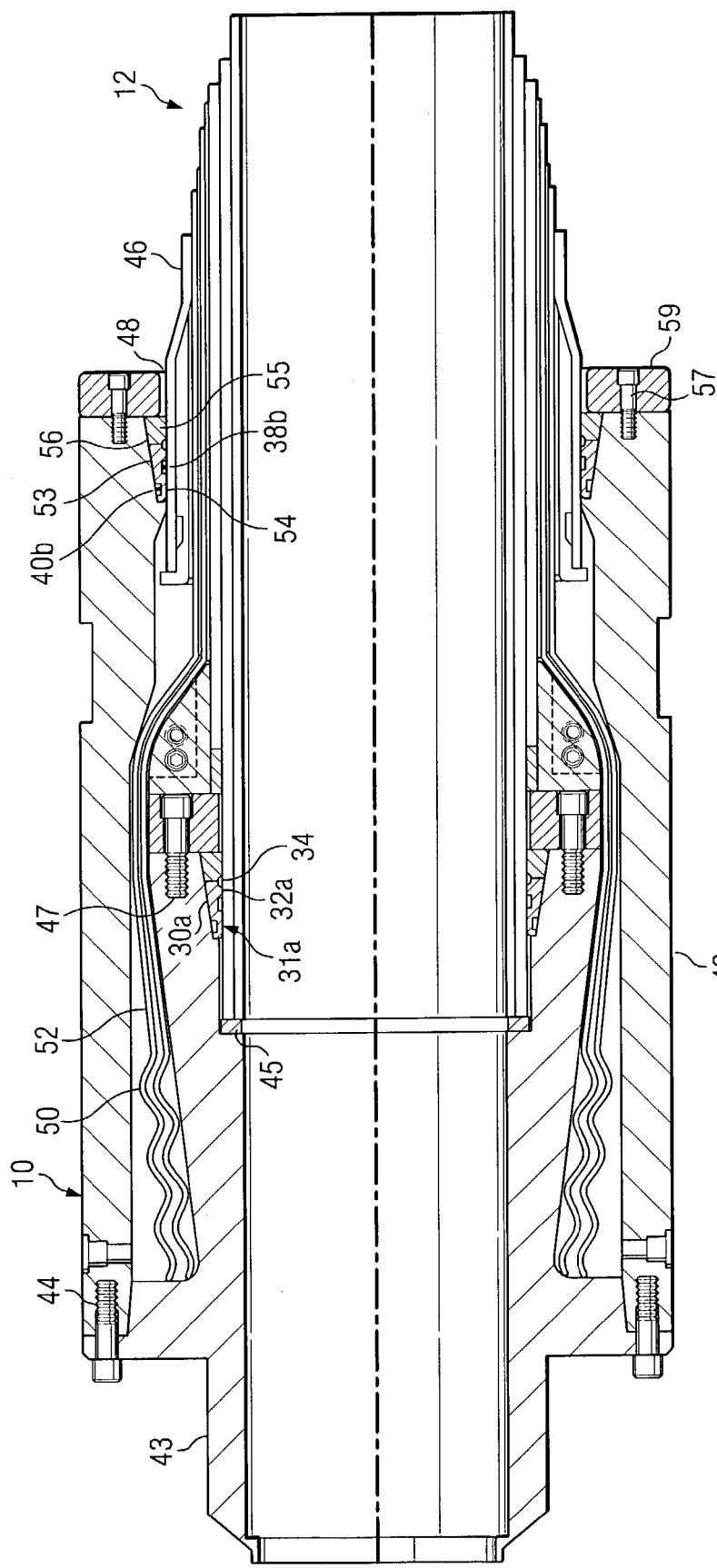
FIG. 3 is a further sectional view of an end fitting containing multiple seal constructions in accordance with the invention.

Alternative embodiments are shown in FIGS. 3 and 4. For brevity and clarity, a description of those parts which are identical or similar to those described in connection with the first embodiment will not be repeated here. Reference should be made to the foregoing paragraphs with the following description to arrive at a complete understanding of additional embodiment.

Referring now to FIG. 3, there is illustrated an end fitting 10 which includes a tubular insert 43 secured via bolts 44 to a body 49. A counter-bore 45 within the insert 43 accommodates receipt of the flexible pipe end 12 while an internally extending plastic cover 46 encircles the pipe at an entrance 48. Corrugated wires 50 are secured in epoxy 52 to maintain the structural integrity of the unit. Contained within the end fitting are the inner seal unit 31a with its housing ring 32a in a tapered recess 30a. In this embodiment, there is also an outer seal unit 53.

FIG. 4 is a detail view of the seal unit 31a and surrounding components from the embodiment illustrated in FIG. 3. An interior surface 41 of a counter-bore defined in the tubular insert 43 and the exterior surface of a barrier layer 16 defines a wedge-like tapered recess 30a. The tapered wedge-shaped seal unit 31a is positioned within the recess 30a. In the illustrative embodiment, the seal unit 31a comprises the housing ring 32a and a housing drive-ring 34a. The housing ring 32a is generally wedge shaped so as to fit within the tapered recess 30a. The housing ring 32a may have annular grooves defined on its interior surface, such as annular groove 37a. A compressible seal 38a, such as an elastomeric O-ring, may be positioned within the annular groove 37a. Similarly, the housing ring 32a may have an annular groove 39a defined in its exterior surface. A compressible seal 40a may be positioned in the annular groove 39a.

The operation of this embodiment is similar to the one described with reference to FIG. 2. When a plurality of bolts 47 are tightened, an inner collar 24a moves closer to the tubular insert 43. As the inner collar 24a moves closer, the drive ring 34a is also moved closer to the tubular insert 43. The movement of the drive ring 34a causes an axial force on the seal unit 31a thereby driving the housing ring 32a further into the recess 30a. The axial force on the seal unit 31a also causes the seal unit to deform in a radially inwardly direction towards the underling barrier layer 16. This reduces the inside diameter of the housing ring 32a and the drive ring 34a by forcing them onto a mating part of the end fitting which has a diameter smaller than that of the housing ring. This radial deformation causes the surface of the barrier layer 16 to deform until all gaps between the barrier layer 16 and the seal unit 31a are eliminated. Flexible seals, such as the seals 38a and 40a, may also be used to further reinforce the seal in the event of additional relaxation of the barrier layer 16.

Turning back to FIG. 3, one skilled in the art would realize that a similar situation occurs with respect to the outer seal unit 53. When a plurality of bolts 57 are tightened, an outer collar 59 moves closer to the body 49. As the outer collar 59 moves closer, the housing drive ring 55 is also moved closer to the body 49. The movement of the drive ring 55 causes an axial force on the seal unit 53 thereby driving the housing ring 54 further into the recess 56. The axial force on the seal unit 53 also causes the seal unit to deform in a radially inwardly direction towards the underling plastic cover 46. This reduces the inside diameter of the housing ring 54 and the drive ring 55 by forcing it onto the plastic cover 46 which has a diameter smaller than that of the housing ring. This radial deformation causes the surface of the plastic cover 46 to deform until all gaps between the plastic cover 46 and the seal unit 53 are eliminated. Flexible seals, such as the seals 38*b* and 40*b,* may also be used to further reinforce the seal in the event of additional relaxation of the barrier layer 16.

Some end fitting constructions may optionally also include a middle seal unit similar to and axially between inner and outer seal units 31 and 53. A detail of one such embodiment is illustrated in FIG. 5, which illustrates a middle seal unit 60. A housing ring 62 is wedged into a tapered recess 64 of a collar 66. Included within the housing ring 62 are opposite elastomeric seals 38*c* and 40*c,* which are similar to seals 38 and 40 described above. In this embodiment, a collar 67 can be used to drive the housing ring 62 into the tapered recess 64 when a plurality of bolts 69 are tightened. As illustrated, once the housing ring 62 is in place, the layer 16 deforms in a radially inward direction to accommodate the housing ring 62.

Figure 6:
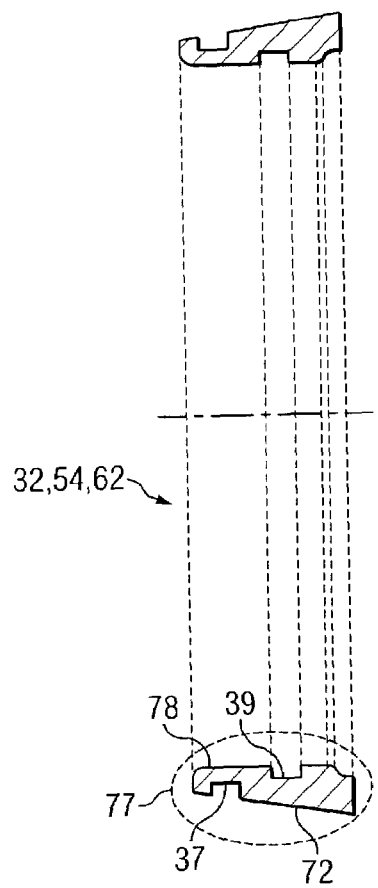
FIG. 6 is a sectional elevation of the seal housing of the invention.
Figure 7:
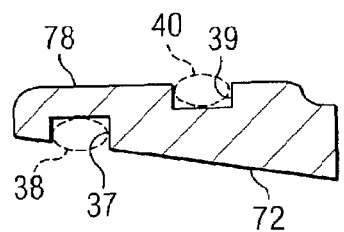
FIG. 7 is an enlarged sectional view of the encircled portion 77 of FIG. 6.

FIGS. 6 and 7 are section views of one embodiment of a housing ring, such as the housing ring 32, which could be used in various embodiments of the invention. Housing rings 54 and 62 could be of a similar configuration but with different diameters. In one embodiment, the housing rings 32, 54, and 62 may be formed of hard metal, having a cross sectionally tapered section as illustrated in FIG. 6. An outside surface 72 of the ring may include one or more annular grooves, such as the groove 37 in which to contain an elastomeric or flexible resilient seal, for instance an O-ring seal 38. Optionally, the housing rings can also include one or more internal grooves, such as groove 39, on the interior surface 78 for receiving an additional seal, such as an o-ring seal 40.

Figure 8:
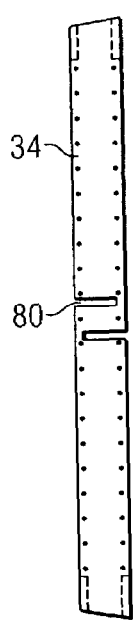
FIG. 8 is a side elevation of the seal drive ring.
Figure 9:
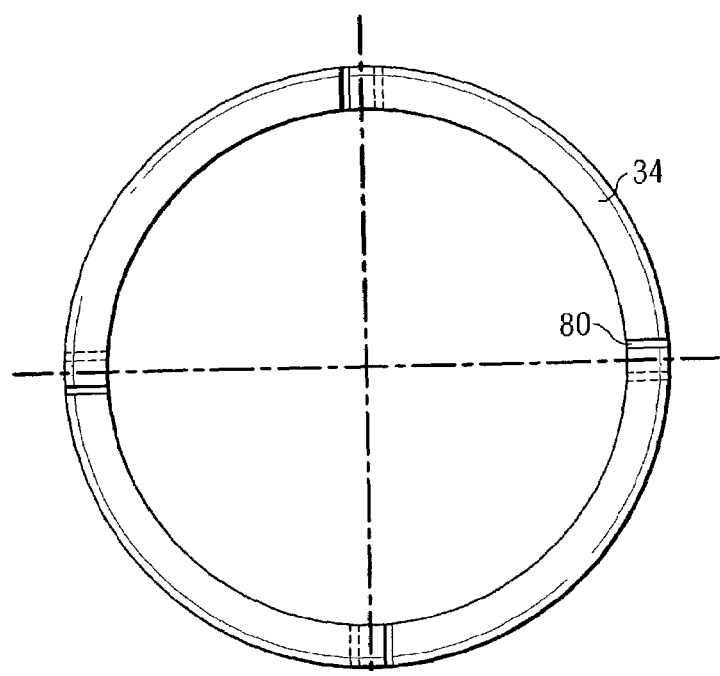
FIG. 9 is a front elevation of the seal drive ring.

FIGS. 8 and 9 illustrate one embodiment of a drive ring, such as the drive ring 34. The drive ring 34 is tapered similarly as the housing rings and include side cuts 80 to permit a controlled collapse in the course of being forced into its receptive recess behind a seal ring.

The resilient seals 38, 40 can be O-ring, cup seal, X-ring, or other suitable shape that can be coupled to a housing ring 32, 54 and 62. On being forced into an encircling body with a matching taper but having a diameter smaller than that of the housing ring the inside diameter of the housing ring is caused to be reduced.

In this manner, sealing is provided and maintained against any irregular surface which may be an extruded polymer tube such as the barrier layer 16. By forcing the housing ring onto the polymer tube, any irregularities are gradually reduced until gaps between the housing ring and the polymer tube are eliminated. By eliminating the gaps, the potential for extrusion of the resilient seal is likewise eliminated.

Such construction can be used to seal high pressures since extrusion of the resilient seals is precluded. At the same time, the seal is superior to existing mechanical seals used in flexible pipes or hoses since mechanical seals require mechanical compression between the seal ring and the polymer layer. Moreover, the construction is not limited to the fluid sealing layer of flexible pipe since it can be readily applied to any extruded polymer layer of a flexible pipe or hose.

Significant for the foregoing is the use of a compressible metal seal housing ring or relatively hard polymer housing ring for the seal to deform the mating layer in such a way as to eliminate gaps. The design can be used to seal high pressures since extrusion of the resilient seal is avoided. Moreover, it is superior to existing mechanical seals used on flexible pipes or hoses since mechanical seals require mechanical compression between the seal ring and the polymer layer. Phenomena such as thermal expansion and creep can work to reduce or eliminate such compression.

At the same time, such construction is not limited to the fluid sealing layer of flexible pipe, since it can be readily applied to any extruded polymer layer in a flexible pipe or hose. By means thereof, a resilient seal applied directly to an extruded polymer layer, and housed in a metal housing which is forced onto the polymer layer to eliminate gaps, the previous problems associated with temperature induced seal failure in an end fitting is substantially if not completely eliminated. Furthermore, embodiments of the present invention work with flowlines which have barrier layers and flowlines which do not have barrier layers.

By the above description there is disclosed a novel seal construction for an end fitting that contributes significantly to the overall reliability of the end fitting per se. It achieves the intended result with only minor changes in construction so as not to contribute to any significant cost increase in manufacture of the overall end fitting. The virtues thereof can be readily appreciated by those skilled in the art.

Since many changes could be made in the above construction and many apparently widely different embodiments of this invention could be made without departing from the scope thereof, it is intended that all matter contained in the drawings and specification shall be interpreted as illustrative and not in a limiting sense.

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims. In the claims, means-plus-function clauses are intended to cover the structures described herein as performing the recited function and not only structural equivalents, but also equivalent structures.

What is claimed is:

1. An apparatus for transporting fluid, the apparatus comprising:
   a flexible pipe;
   an annular body member having an end portion extending over an end portion of the pipe and having an inner bore portion that is tapered radially outwardly in a direction towards the latter end of the body member;
   the tapered inner bore portion of the body member and the corresponding outer surface of the pipe defining a tapered recess;
   a wedged-shaped sealing ring extending in the tapered recess;
   a drive ring extending in the tapered recess and around the pipe and between the sealing ring and the end of the body member; and
   a driving member for driving the drive ring into the tapered recess and in engagement with the sealing ring to drive the sealing ring in an axial direction in the tapered recess to compress and deform the sealing ring to establish a seal;
   wherein the pipe has an outer layer and an inner layer and wherein the body member extends over an end portion of the outer layer, and further comprising a barrier sleeve extending between the outer layer and the inner layer and axially aligned with the sealing ring.

2. An apparatus for transporting fluid, the apparatus comprising:
a flexible pipe;
an annular body member having an end portion extending over an end portion of the pipe and having an inner bore portion that is tapered radially outwardly in a direction towards the latter end of the body member;
the tapered inner bore portion of the body member and the corresponding outer surface of the pipe defining a tapered recess;
a wedged-shaped sealing ring extending in the tapered recess;
a drive ring extending in the tapered recess and around the pipe and between the sealing ring and the end of the body member;
a driving member for driving the drive ring into the tapered recess and in engagement with the sealing ring to drive the sealing ring in an axial direction in the tapered recess to compress and deform the sealing ring to establish a seal; and
a flexible O-ring disposed in a groove formed in the outer surface of the sealing ring to provide an additional seal.

3. An apparatus for transporting fluid, the apparatus comprising:
a flexible pipe;
an annular body member having an end portion extending over an end portion of the pipe and having an inner bore portion that is tapered radially outwardly in a direction towards the latter end of the body member;
the tapered inner bore portion of the body member and the corresponding outer surface of the pipe defining a tapered recess;
a wedged-shaped sealing ring extending in the tapered recess;
a drive ring extending in the tapered recess and around the pipe and between the sealing ring and the end of the body member;
a driving member for driving the drive ring into the tapered recess and in engagement with the sealing ring to drive the sealing ring in an axial direction in the tapered recess to compress and deform the sealing ring to establish a seal; and
a flexible O-ring positioned in a groove formed in the inner surface of the sealing ring to provide an additional seal.

4. An apparatus for transporting fluid, the apparatus comprising:
a flexible pipe;
an annular body member having an end portion extending over an end portion of the pipe and having an inner bore portion that is tapered radially outwardly in a direction towards the latter end of the body member;
the tapered inner bore portion of the body member and the corresponding outer surface of the pipe defining a tapered recess;
a wedged-shaped sealing ring extending in the tapered recess;
a drive ring extending in the tapered recess and around the pipe and between the sealing ring and the end of the body member; and
a driving member for driving the drive ring into the tapered recess and in engagement with the sealing ring to drive the sealing ring in an axial direction in the tapered recess to compress and deform the sealing ring to establish a seal;
wherein the driving member comprises a collar extending around the pipe in a spaced relation to the body member, and a bolt extending through the collar and in a threaded engagement with the body member so that rotation of the bolt causes axial movement of the collar against the drive ring.

5. The apparatus of claim 4 wherein the deformation of the sealing ring eliminates gaps between it and the corresponding surfaces of the pipe and the body member.

6. A method comprising:
providing a tapered inner bore portion in an annular body member, the tapered inner bore portion being tapered radially outwardly toward an end portion of the body member;
disposing said end portion of the body member over an end portion of a flexible pipe so that the tapered inner bore portion of the body member and the corresponding outer surface of the pipe define a tapered recess;
inserting a wedge-shaped sealing ring in the tapered recess;
inserting a drive ring in the tapered recess and around the pipe and between the sealing ring and the end of the body member;
driving the drive ring into the tapered recess and into engagement with the sealing ring to drive the sealing ring in an axial direction in the tapered recess to compress and deform the sealing ring to establish a seal;
wherein the pipe has an outer layer and an inner layer and wherein the body member extends over an end portion of the outer layer, and further comprising positioning a barrier sleeve between the outer layer and the inner layer and axially aligned with the sealing ring.

7. A method comprising:
providing a tapered inner bore portion in an annular body member, the tapered inner bore portion being tapered radially outwardly toward an end portion of the body member;
disposing said end portion of the body member over an end portion of a flexible pipe so that the tapered inner bore portion of the body member and the corresponding outer surface of the pipe define a tapered recess;
inserting a wedge-shaped sealing ring in the tapered recess;
inserting a drive ring in the tapered recess and around the pipe and between the sealing ring and the end of the body member;
driving the drive ring into the tapered recess and into engagement with the sealing ring to drive the sealing ring in an axial direction in the tapered recess to compress and deform the sealing ring to establish a seal; and
disposing a flexible O-ring in a groove formed in the outer surface of the sealing ring to provide an additional seal.

8. A method comprising:
providing a tapered inner bore portion in an annular body member, the tapered inner bore portion being tapered radially outwardly toward an end portion of the body member;
disposing said end portion of the body member over an end portion of a flexible pipe so that the tapered inner bore portion of the body member and the corresponding outer surface of the pipe define a tapered recess;
inserting a wedge-shaped sealing ring in the tapered recess;
inserting a drive ring in the tapered recess and around the pipe and between the sealing ring and the end of the body member;

driving the drive ring into the tapered recess and into engagement with the sealing ring to drive the sealing ring in an axial direction in the tapered recess to compress and deform the sealing ring to establish a seal; and disposing an additional seal by disposing a flexible O-ring positioned in a groove formed in the inner surface of the sealing ring to provide an additional seal.

9. A method comprising:

providing a tapered inner bore portion in an annular body member, the tapered inner bore portion being tapered radially outwardly toward an end portion of the body member;

disposing said end portion of the body member over an end portion of a flexible pipe so that the tapered inner bore portion of the body member and the corresponding outer surface of the pipe define a tapered recess;

inserting a wedge-shaped sealing ring in the tapered recess;

inserting a drive ring in the tapered recess and around the pipe and between the sealing ring and the end of the body member;

driving the drive ring into the tapered recess and into engagement with the sealing ring to drive the sealing ring in an axial direction in the tapered recess to compress and deform the sealing ring to establish a seal; and providing a collar around the pipe in a spaced region to the body member, and extending a bolt through the collar and in a threaded engagement with the body member; and rotating the bolt to cause axial movement of the collar against the drive ring.

10. The method of claim 9 wherein the deformation of the sealing ring eliminates gaps between it and the corresponding surfaces of the pipe and the body member.

* * * * *